US012737414B2

(12) United States Patent
Shin

(10) Patent No.: US 12,737,414 B2
(45) Date of Patent: Sep. 15, 2026

(54) CONVERTING VIDEO SEMANTICS INTO LANGUAGE FOR REAL-TIME QUERY AND INFORMATION RETRIEVAL

(71) Applicant: GOOGLE LLC, Mountain View, CA (US)

(72) Inventor: Dongeek Shin, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 197 days.

(21) Appl. No.: 18/535,554

(22) Filed: Dec. 11, 2023

(65) Prior Publication Data

US 2025/0190488 A1 Jun. 12, 2025

(51) Int. Cl.
*G06F 16/583* (2019.01)
*G06F 40/30* (2020.01)
*G06V 10/764* (2022.01)

(52) U.S. Cl.
CPC ............ *G06F 16/583* (2019.01); *G06F 40/30* (2020.01); *G06V 10/764* (2022.01)

(58) Field of Classification Search
CPC ...... G06F 16/582; G06F 40/30; G06V 10/764
See application file for complete search history.

(56) References Cited

U.S. PATENT DOCUMENTS 9,462,230 B1* 10/2016 Agrawal ................ G06Q 50/20
2002/0097380 A1* 7/2002 Moulton ............. G11B 27/022 704/E21.02
2005/0068581 A1* 3/2005 Hull ........................ G06F 3/122 358/1.15
2013/0343721 A1 12/2013 Abecassis
2014/0316785 A1 10/2014 Bennett et al.
2018/0352195 A1 12/2018 Segal
2018/0359530 A1 12/2018 Marlow et al.
2021/0250404 A1* 8/2021 Xia .................... H04N 21/2315
2023/0306056 A1* 9/2023 Lee ........................ G06V 20/49
2024/0346102 A1* 10/2024 Miller ................. G06F 16/9577
2024/0394404 A1* 11/2024 O'Neal ............... G06F 21/6245
2025/0190488 A1* 6/2025 Shin ........................ G06F 40/56
2025/0232123 A1* 7/2025 Tow ...................... G06F 3/0482
2025/0315283 A1* 10/2025 Volyn ...................... G06F 3/011
2025/0355905 A1* 11/2025 Brenner ................ G06F 16/338

OTHER PUBLICATIONS

Zeng et al, Leveraging Video Descriptions to Learn Video Question Answering, Dec. 16, 2016 (Year: 2016).*

(Continued)

*Primary Examiner* — Kevin Ky
(74) *Attorney, Agent, or Firm* — Gray Ice Higdon

(57) ABSTRACT

Implementations utilize a LLM to generate content responsive to a user query directed to a video and cause audio data for the generated content to be rendered as a response to the user query. Implementations extract a subset of frames from all frames of the video as key frame(s) for the video, and utilize a vision-language model in generating a natural language description for the key frame(s) of the video. A prompt can be generated based on a transcription of the user query and based on the natural language description for the key frame(s) of the video. The prompt is processed as input, using the LLM, to generate the content responsive to the user query directed to the video.

7 Claims, 11 Drawing Sheets

(56) References Cited

OTHER PUBLICATIONS

Khurana et al., "Video Question-Answering Techniques, Benchmark Datasets and Evaluation Metrics Leveraging Video Captioning: A Comprehensive Survey" DOI: 10.1109/ACCESS.2017, 25 pages, vol. 4, dated 2016.

Zeng, A. et al., "Socratic Models: Composing Zero-Shot Multimodal Reasoning with Language"; arXiv.org, Cornell University; arXiv:2204.00598; 20 pages; dated Apr. 1, 2022.

European Patent Office; International Search Report and Written Opinion issued in Application No. PCT/US2024/054390; 10 pages; dated Feb. 27, 2025.

* cited by examiner

Figure 1A:
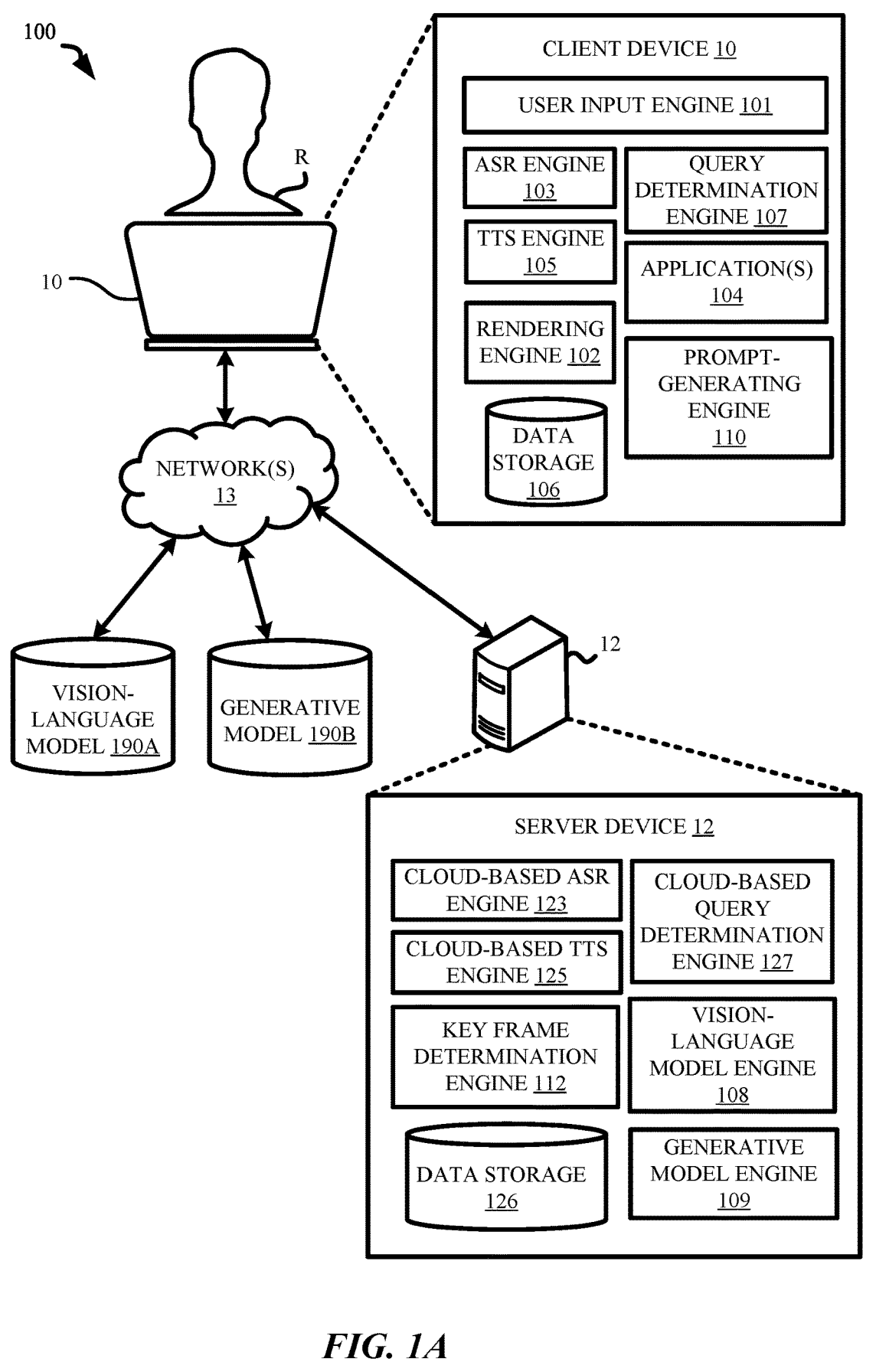

100

R

10

CLIENT DEVICE 10

USER INPUT ENGINE 101

ASR ENGINE 103

QUERY DETERMINATION ENGINE 107

TTS ENGINE 105

APPLICATION(S) 104

RENDERING ENGINE 102

PROMPT-GENERATING ENGINE 110

DATA STORAGE 106

NETWORK(S) 13

VISION-LANGUAGE MODEL 190A

GENERATIVE MODEL 190B

12

SERVER DEVICE 12

CLOUD-BASED ASR ENGINE 123

CLOUD-BASED QUERY DETERMINATION ENGINE 127

CLOUD-BASED TTS ENGINE 125

KEY FRAME DETERMINATION ENGINE 112

VISION-LANGUAGE MODEL ENGINE 108

DATA STORAGE 126

GENERATIVE MODEL ENGINE 109

Figure 4:
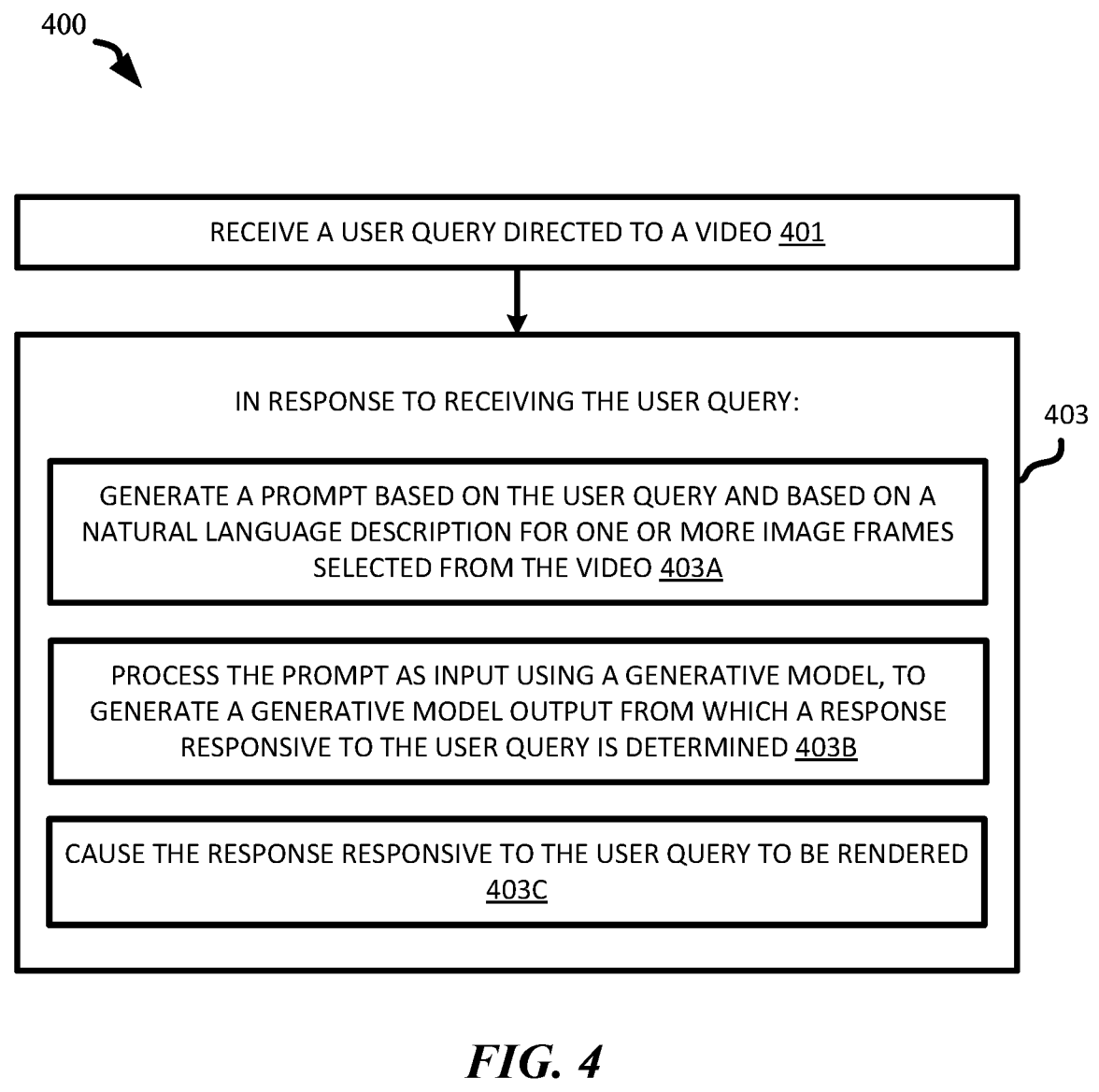

RECEIVE A USER QUERY DIRECTED TO A VIDEO 401

IN RESPONSE TO RECEIVING THE USER QUERY:

GENERATE A PROMPT BASED ON THE USER QUERY AND BASED ON A NATURAL LANGUAGE DESCRIPTION FOR ONE OR MORE IMAGE FRAMES SELECTED FROM THE VIDEO 403A

PROCESS THE PROMPT AS INPUT USING A GENERATIVE MODEL, TO GENERATE A GENERATIVE MODEL OUTPUT FROM WHICH A RESPONSE RESPONSIVE TO THE USER QUERY IS DETERMINED 403B

CAUSE THE RESPONSE RESPONSIVE TO THE USER QUERY TO BE RENDERED 403C

CONVERTING VIDEO SEMANTICS INTO LANGUAGE FOR REAL-TIME QUERY AND INFORMATION RETRIEVAL

BACKGROUND

Various generative models can be used to process natural language (NL) content and/or other input(s), to generate output that reflects generative content that is responsive to the input(s). For example, large language models (LLMs) have been developed that can be used to process NL content and/or other input(s), to generate LLM output that reflects generative NL content and/or other generative content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section".

A generative model can be of a very large size. For example, an LLM can include billions of parameters (e.g., over 100 billion parameters, over 250 billion parameters, or over 500 billion parameters).

SUMMARY

Implementations disclosed herein are directed to utilizing a generative model to generate content responsive to a user query that is directed to a video. In various implementations, the user query and text extracted from key frame(s) of the video can be processed using the generative model, resulting in content that is accurately and/or appropriately responsive to the user query. In some implementations, the key frame(s) can be determined/selected from the video prior to receiving the user query. It is noted that the key frame(s) are a subset of all frames of the video because processing all frames of a video using a vision-language model (which may have billions of parameters) may be computationally impracticable. In various implementations, the text can be extracted from the key frame(s) using the vision-language model (sometimes referred to as "visual language model"). By determining/selecting the key frame(s) from the video prior to receiving the user query, latency in generating and rendering the content responsive to the user query (e.g., a real-time query) can be reduced. Leveraging the reduced latency, the overall duration of the human to computer interaction can be reduced, which saves resources such as computational resource(s), network resource(s), and/or battery resource(s). Moreover, by extracting and utilizing the text from the key frame(s) of the video, the content responsive to the user query can be of relatively high accuracy and can satisfy informational needs of a user that provides the user query.

In various implementations, the generative model can be utilized on a client device, or can be utilized on remote server(s) that are remote from the client device. In some implementations, the generative model can be a relatively small large language model (LLM) having, for instance, less than 100 billion parameters. In some other implementations, the generative model can be a relatively large LLM that includes, for instance, over 200 billion parameters. The larger the LLM, the higher the probability that the content generated by the generative model based on the user query and/or the key frame(s) will be accurate, sophisticated, and desirable to the user. In some implementations, depending on a size of parameters of the generative model, memory constraints of the client device may prevent the generative model from being utilized or stored at the client device.

As a non-limiting working example, when watching a video via a third-party application, a user may provide a spoken utterance such as "what's the name of the song". The spoken utterance can be parsed/recognized to determine a user query in natural language (i.e., "what's the name of the song" in natural language). In response to receiving the spoken utterance, a prompt can be generated based on the user query in natural language and text determined based on one or more key frames of the video. The prompt can be processed as input, using a generative model (e.g., an LLM), to generate a model output from which a response responsive to the user query is determined. The one or more key frames can be a subset of all frames of the video.

In the working example, the video can have a predetermined length. For instance, the video shot at 26 FPS may have a length of about ten minutes and thus have a total number of about 15,000 frames). In this case, the number of the one or more key frames may be much smaller than the total number of the frames of the video and can be 3, 5, 10, or 20, etc. The one or more key frames can be determined based on various factors. For instance, the 10-min video may include a first portion corresponding to a first song, a second portion corresponding to a second song, and a third portion corresponding to a third song. In this case, the key frame(s) for the 10-min video may include one or more frames (e.g., showing a title, a well-known or classic scene, etc.) from the first portion of the video that characterizes the first song, one or more frames (e.g., showing a title, a well-known or classic scene, etc.) from the second portion of the video that characterizes the second song, and one or more frames (e.g., showing a title, a well-known or classic scene, etc.) from the third portion of the video that characterizes the third song.

Additionally or alternatively, the one or more key frames for the 10-min video may include a first frame that the video begins with, a first transition frame showing or indicating transition from the first song to the second song, and a second transition frame showing or indicating transition from the second song to the third song. The one or more key frames can also be determined in other manners, which are not limited to descriptions herein. Key frames in some implementations may correspond to intra-frame (e.g., "I-frame") frames in MPEG video compression, but this is not required.

Continuing with the working example above, the one or more key frames can be processed using a vision-language model, to generate the text that describes or summarize the one or more key frames. For instance, assume that the one or more key frames include a first frame for the first song, a second frame for the second song, and a third frame for the third song. The first frame can be processed as input using the vision-language model, to generate a first output from which a first text corresponding to the first song is determined. The second frame can be processed as input using the vision-language model, to generate a second output from which a second text corresponding to the second song is determined. The third frame can be processed as input using the vision-language model, to generate a third output from which a third text corresponding to the third song is determined. The first text, the second text, and the third text can be processed (e.g., combined) to generate the text characterizing, representing, or describing the video. Such text can be stored in association with the video. Alternatively or additionally, the first text, the second text, and the third text can be separately stored in association with the video.

Optionally, the first to third text can each be stored with a time stamp that indicates a time at which a corresponding frame is played or to be played. In this case, the first text accompanied by a first time stamp (indicating a position of the first frame in the video), the second text accompanied by a second time stamp (indicating a position of the second frame in the video), and the third text accompanied by a third time stamp (indicating a position of the third frame in the video) can be stored in association with the video.

In some implementations, the spoken utterance or the user query can be processed to determine one or more query features, contextual feature(s), and/or attribute feature(s) associated with a client device and/or the user that provides the utterance/query. For example, when the spoken utterance includes a natural language query (e.g., automatically generated or generated based on user interface input), the one or more query features can include: term(s) of the query; an embedding of the term(s) of the query (e.g., generated using a separate encoder); topic(s) or domain(s) reflected by the query; and/or other feature(s) derivable from the query. As another example, when the user request includes a query with an image, the query feature(s) can include: an automatically generated caption of the image; descriptor(s) of object(s) automatically detected in the image; and/or other feature(s) derivable from the image. The contextual feature(s) can be or can include, for instance, a first feature relating to a tone of the user request (if the user request is an audible request) determined based on audio data capturing the user request. The attribute feature(s) can be determined, for instance, based on a user profile of the user.

In some implementations, the generative model is a sequence-to-sequence model, is transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

In various implementations, a method implemented using one or more processors is provided. The method includes determining one or more key image frames ("one or more key frames") from a video; and processing the one or more key image frames using a vision-language model. In some implementations, determining the one or more keyframes from the video includes: evaluating a plurality of frames of the video to select, as the one or more key video frames that comprise less than all of the frames of the video, one or more of the plurality of frames that satisfy one or more criteria. In these implementations, the one or more criteria include a measure of visual difference between two adjacent frames of the plurality of video frames satisfying a threshold. Alternatively or additionally, the one or more criteria include a new object being detected in a frame of the plurality of frames of the video. Alternatively or additionally, the one or more criteria include a new voice being detected in an audio portion of the video that corresponds temporally with a frame of the plurality of frames of the video.

In some implementations, processing the one or more key image frames to the vision-language model causes a natural language description of the one or more key image frames to be generated using the vision-language model. In some implementations, the one or more key image frames include multiple key image frames. In this case, processing the one or more key image frames using the vision-language model includes: for each of multiple key image frames: processing a respective key image frame as input using the vision-language model, to generate a respective model output from which a respective text is determined for the respective key image frame, and assembling the natural language description based on a combination of the respective text for each of the multiple key image frames.

In some implementations, the method further includes: storing the natural language description for the one or more key image frames in association with the video.

In some implementations, the method further includes: receiving, from a computing device, a user query related/directed to the video. In some implementations, the user query can be received when a current image frame of the video is being rendered. In these implementations, the one or more key image frames includes a first key image frame that occurs earlier than the current image frame in the video. Alternatively or additionally, the one or more key image frames includes a second key image frame that occurs later than the current image frame in the video.

In some implementations, in response to receiving the user query, the method further includes: generating a prompt based on the user query and based on the natural language description for the one or more key image frames of the video; processing the prompt as input using a generative model, to generate a generative model output, where the generative model output is operable to cause a response responsive to the user query to be rendered by an output device; and providing the generative model output to the computing device.

The preceding is presented as an overview of only some implementations disclosed herein. These and other implementations are disclosed in additional detail herein. For example, additional and/or alternative implementations are disclosed herein such as those directed to determining a current image frame ("current frame") of the video which is currently being rendered when the user query is received, processing the current image frame to determine a natural language description for the current image frame, and generating the prompt based on the user query, the natural language description for the one or more key image frames of the video, and further based on the natural language description for the current image frame.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

FIG. 1A depicts a block diagram of an example environment that demonstrates various aspects of the present disclosure, and in which some implementations disclosed herein can be implemented.

FIG. 4 depicts a flowchart illustrating another example method of generating content responsive to a user query, in accordance with various aspects of the present disclosure.

DETAILED DESCRIPTION

Figure 1B:
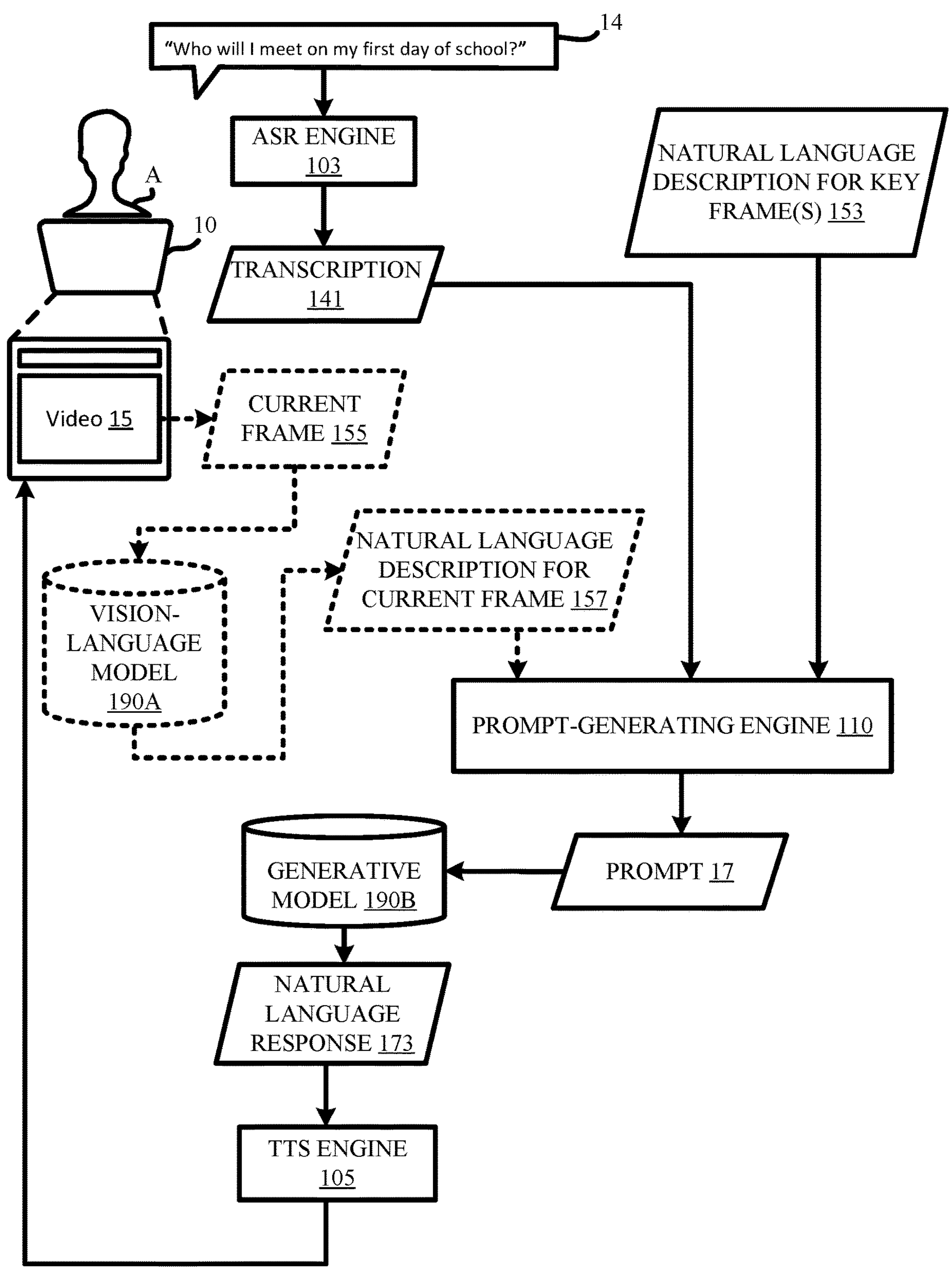
FIG. 1B illustrates an example of rendering a response that demonstrates various aspects of the present disclosure, and in which some implementations disclosed herein can be implemented.

The following description with reference to the accompanying drawings is provided for understanding of various implementations of the present disclosure. It's appreciated that different features from different embodiments may be combined with and/or exchanged for one another. In addition, those of ordinary skill in the art will recognize that various changes and modifications of the various embodiments described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used by the inventor to enable a clear and consistent understanding of the present disclosure. Accordingly, it should be apparent to those skilled in the art that the following description of various embodiments of the present disclosure is provided for the purpose of illustration only and not for the purpose of limiting the present disclosure as defined by the appended claims and their equivalents.

FIG. 1A is a block diagram of an example environment 100 that demonstrates various aspects of the present disclosure, and in which implementations disclosed herein may be implemented. As shown in FIG. 1A, the environment 100 can include a client computing device 10 ("client device"), and a server computing device 12 ("server device") in communication with the client computing device 10 via one or more networks 13. The one or more networks 13 can include, for example, a local area network (LAN), a wide area network (WAN) such as the Internet, and/or any other appropriate network.

The client computing device 10 can be, for example, a desktop computing device, a laptop computing device, a tablet computing device, a mobile phone computing device, a computing device of a vehicle (e.g., an in-vehicle entertainment system), an interactive speaker, a smart appliance such as a smart television, and/or a wearable apparatus that includes a computing device (e.g., glasses having a computing device, a virtual or augmented reality computing device), and the present disclosure is not limited thereto.

In various implementations, the client computing device 10 can include a user input engine 101 that is configured to detect user input provided by a user of the client computing device 10 using one or more user interface input devices. For example, the client computing device 10 can be equipped with one or more microphones that capture audio data, such as audio data corresponding to spoken utterances of the user or other sounds in an environment of the client computing device 10. Additionally, or alternatively, the client computing device 10 can be equipped with one or more vision components that are configured to capture vision data corresponding to images and/or movements (e.g., gestures) detected in a field of view of one or more of the vision components.

Additionally, or alternatively, the client computing device 10 can be equipped with one or more touch sensitive components (e.g., a keyboard and mouse, a stylus, a touch screen, a touch panel, one or more hardware buttons, etc.) that are configured to capture signal(s) corresponding to touch input directed to the client computing device 10. Some instances of a query described herein, that can be included in a request, can be a query that is formulated based on user input provided by a user of the client computing device 10 and detected via the user input engine 101. For example, the query can be a typed query that is typed via a physical or virtual keyboard, a suggested query that is selected via a touch screen or a mouse, a spoken voice query that is detected via microphone(s) of the client device, or an image query that is based on an image captured by a vision component of the client device.

In various implementations, the client computing device 10 can include a rendering engine 102, and/or a storage 106. In various implementations, the rendering engine 102 can be configured to provide content (e.g., a natural language based response generated by an LLM) for audible and/or visual presentation to a user of the client computing device 10 using one or more user interface output devices. For example, the client computing device 10 can be equipped with one or more speakers that enable content to be provided for audible presentation to the user via the client computing device 10. Additionally, or alternatively, the client computing device 10 can be equipped with a display or projector that enables content to be provided for visual presentation to the user via the client computing device 10. The storage 106, for instance, can include a key frame description database (e.g., 150 in FIG. 1C) that stores one or more entries each identifying a video and associating an identifier (e.g., name, address, ID, etc.) of the video with a natural language description for key frame(s) of the video.

In various implementations, the client computing device 10 can further include a plurality of local components. The plurality of local components can include an automatic speech recognition (ASR) engine 103 and/or a text-to-speech (TTS) engine 105. In various implementations, the client computing device 10 can further include one or more applications 104 installed at, or accessible via, the client computing device 10. In some implementations, the one or more applications can include an automated assistant (may also be known as "chatbot", "interactive assistant", etc.), and the ASR engine 103 and/or the TTS engine 105 may be included in the automated assistant. In some implementations, the automated assistant can further include additional component(s), such as a NLU engine and/or a fulfillment engine. In some implementations, the one or more applications can include one or more third-party applications, and a user R of the client computing device 10 may have a registered account associated with the automated assistant and/or the one or more third-party applications. The one or more third-party applications can include, for example, a social media application, a video player, a note-taking application, a shopping application, a messaging application, and/or any other appropriate applications (or services), installed at (or accessible via) the client computing device 10.

The server computing device 12 can be, for example, a web server, one or more blade servers acting together to provide "cloud" infrastructure, or any other type of server as needed. In various implementations, the server computing device 12 can include cloud-based components the same as or similar to the plurality of local components installed at the client computing device 1. For example, the server computing device 12 can include a cloud-based ASR engine 123, a cloud-based TTS engine 125, a cloud-based NLU engine (not depicted), and/or a cloud-based fulfillment engine (not depicted).

The ASR engine 103 (and/or the cloud-based ASR engine 123) can process, using one or more streaming ASR models (e.g., a recurrent neural network (RNN) model, a transformer model, and/or any other type of ML model capable of performing ASR), streams of audio data that capture spoken utterances and that are generated by microphone(s) of the client computing device 10 to generate corresponding streams of ASR output. Notably, the streaming ASR model can be utilized to generate the corresponding streams of ASR output as the streams of audio data are generated.

The NLU engine and/or the cloud-based NLU engine (neither depicted in the Figures) can process, using one or more NLU models (e.g., a long short-term memory (LSTM), gated recurrent unit (GRU), and/or any other type of RNN or other ML model capable of performing NLU) and/or grammar-based rule(s), the corresponding streams of ASR output to generate corresponding streams of NLU output. The fulfillment engine and/or the cloud-based fulfillment engine (also not depicted) can cause the corresponding streams of NLU output to be processed to generate corresponding streams of fulfillment data. The corresponding streams of fulfillment data can correspond to, for example, corresponding given assistant outputs that are predicted to be responsive to spoken utterances captured in the corresponding streams of audio data processed by the ASR engine 103 (and/or the cloud-based ASR engine 123).

The TTS engine (e.g., 105 and/or 125) can process, using TTS model(s), corresponding streams of textual content to generate synthesized speech audio data that includes computer-generated synthesized speech. The corresponding streams of textual content can correspond to, for example, one or more given assistant outputs, one or more of modified given assistant outputs, and/or any other applicable textual content. The aforementioned ML model(s) can be on-device ML models that are stored locally at the client computing device 10, remote ML models that are executed remotely from the server computing device (e.g., at remote server device 12), or shared ML models that are accessible to both the client computing device 10 and/or remote systems (e.g., the remote server computing device 12). In additional or alternative implementations, corresponding streams of synthesized speech audio data corresponding to the one or more given assistant outputs, the one or more of modified given assistant outputs, and/or any other textual content described herein can be pre-cached in memory or one or more databases accessible by the client computing device 10.

In various implementations, the corresponding streams of ASR output can include, for example, streams of ASR hypotheses (e.g., term hypotheses and/or transcription hypotheses) that are predicted to correspond to spoken utterance(s) of a user that are captured in the corresponding streams of audio data, one or more corresponding predicted measures (e.g., probabilities, log likelihoods, and/or other values) for each of the ASR hypotheses included in the streams of ASR hypotheses, a plurality of phonemes that are predicted to correspond to spoken utterance(s) of a user that are captured in the corresponding streams of audio data, and/or other ASR output. In some versions of those implementations, the ASR engine 103 and/or 123 can select one or more of the ASR hypotheses as corresponding recognized text that corresponds to the spoken utterance(s) (e.g., selected based on the corresponding predicted measures).

In various implementations, the corresponding streams of NLU output can include, for example, streams of annotated recognized text that includes one or more annotations of the recognized text for one or more (e.g., all) of the terms of the recognized text, one or more corresponding predicted measures (e.g., probabilities, log likelihoods, and/or other values) for NLU output included in the streams of NLU output, and/or other NLU output. For example, the NLU engine may include a part of speech tagger (not depicted) configured to annotate terms with their grammatical roles.

Additionally, or alternatively, the NLU engine may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine may include a coreference resolver (not depicted) configured to group, or "cluster," references to the same entity based on one or more contextual cues. For example, the coreference resolver may be utilized to resolve the term "them" to "buy theater tickets" in the natural language input "buy them", based on "theater tickets" being mentioned in a client device notification rendered immediately prior to receiving input "buy them". In some implementations, one or more components of the NLU engine may rely on annotations from one or more other components of the NLU engine. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

In some implementations, the fulfillment engine of the client computing device 10 can include a vision-language model engine 108 and/or a generative model engine 109. In some other implementations, the vision-language model engine 108 and/or the generative model engine 109 can be included in the server computing device 12. However, the present disclosure is not limited thereto. For example, the vision-language model engine 108 can be included in the server computing device 12, and the generative model engine 109 can be included in the client computing device 10.

The vision-language model engine 108 can be in communication with a vision-language model 190A, for text or image to be processed using the vision-language model 190A. The generative model engine 109 can be in communication with a generative model 190B, for text and/or other type of content to be processed using the generative model 190B.

In some implementations, the client computing device 10 or the server device 12 can include a prompt-generating engine 110, configured to generate a prompt to be processed as input using the generative model 190B. In some implementations, the prompt-generating engine 110 can be included in the generative model engine 109. In some implementations, the client computing device 10 can include a query determination engine 107 configured to determine whether a user input includes a user query. In some implementations, in response to the query determination engine 107 determining that a speech recognition of a spoken utterance (e.g., from user R) includes a user query, the prompt-generating engine 110 can generate a prompt (for processing as input using the generative model 190B) based on the user query (e.g., determined from the speech recognition of the user utterance).

In some other implementations, the prompt-generating engine 110 can generate a prompt based on the user query and based on other content (e.g., a natural language description for an image or for one or more image frames from a video). The natural language description for the image (or for the one or more image frames from the video) can be determined using the vision-language model 190A. For example, the image can be processed as input, using the vision-language model 190A, to generate a natural language description of content depicted in the image. As another example, each of the one or more image frames from the video can be processed as input, using the vision-language model 190A, to generate a respective textual description of content depicted in a respective image frame. In this example, the respective textual description for each respective image frame can be combined to generate the natural language description for the multiple image frames from the video.

In some implementations, the vision-language model 190A can be trained using multiple image-text pairs (e.g., millions of image-text pairs). In some implementations, the vision-language model can include an image encoder and/or a text encoder. During training (and subsequent to the training), the image encoder can be configured to map one or more images to a common embedding space that is common to text and images (by generating corresponding image embeddings for the one or more images), and the text encoder can be configured to map one or more text strings to the common embedding space (by generating corresponding text embeddings in the common embedding space). In some implementations, the image encoder and the text encoder can be trained simultaneously to minimize distances between each of a plurality of image embeddings in the common embedding space (that correspond to a respective image from a plurality of images) and a corresponding text embedding from a plurality of text embeddings in the common embedding space (that corresponds to a text string paired with a respective image from the plurality of images), while maximizing distances between each of the plurality of image embeddings that corresponds to a respective image and a text embedding for a text string that is not paired with the respective image.

In some implementations, the image encoder can be, for instance, a trained ResNet or vision transformer. In some implementations, the text encoder can be, for instance, a trained multi-layer text transformer. An image embedding generated using the image encoder can be, for instance, an N-dimensional vector in the common embedding space that numerically represents a corresponding image. A text embedding generated using the text encoder can be, for instance, another N-dimensional vector in the common embedding space that numerically represents a corresponding text string.

In some implementations, the vision-language model can further include a trained text decoder configured to convert a text embedding (which is generated based on a particular image using the image encoder of the vision-language model 190A) in the common embedding space into a corresponding text that describes the particular image. In some implementations, the corresponding text, for instance, can be used as a caption for the particular image. Given one or more key frames from a video and using the trained text decoder and the trained image encoder, natural language content describing the one or more key frames can be determined and the prompt-generating engine 110 can generate a prompt to include the user query and the natural language content that describes the one or more key frames of the video.

In various implementations, the generative model 190B can be a smaller large language model (LLM) having less than 100 billion parameters, or can be a larger LLM that includes over 200 billion parameters. Being a larger LLM, the generative model 190B can assist in generating more accurate or sophisticated content responsive to a user query. The larger LLM may be stored at client computing device 10, or at the server computing device 12 (if the memory of the client computing device 10 restricts the storing of the larger LLM at the client computing device 10). Being a smaller LLM, the generative model 190B may be stored at the client computing device 10, thereby reducing a latency in providing a response responsive to the user query (as the response does not need to be transmitted via the one or more networks 13). By utilizing the vision-language model 190A and the generative model 190B, content of the one or more key frames of the video can be considered in generating the response responsive to a user query, so that the response can be more contextually rich and relevant to the user query.

In some implementations, the generative model 190B is a sequence-to-sequence model, is transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

In various implementations, the client computing device 10 or the server device 12 can include a key frame determination engine 112 which, given one or more videos, determines and/or extracts key frame(s) for each of the one or more videos. The key frame(s) for each of the videos can be respectively processed using the vision-language model 190A, to generate one or more model output each corresponding to a respective key frame from a respective video. The one or more model output for the respective video can be applied to generate natural language content for the respective video (e.g., natural language content that describes or summarizes the respective video). The generated natural language content for the respective video can be stored, e.g., in the storage 106 and/or 126, in association with the respective video.

Figure 1C:
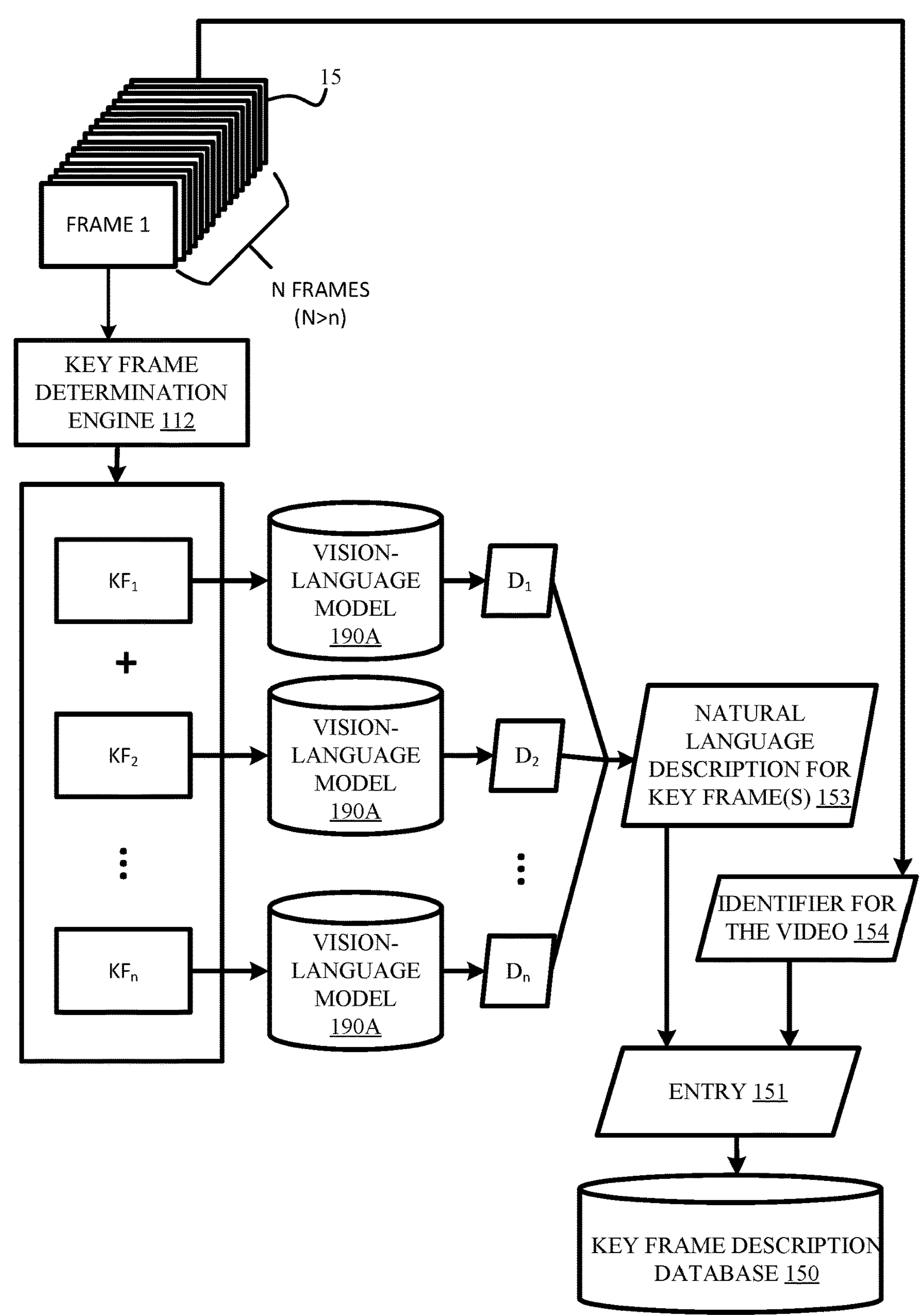
FIG. 1C illustrates an example of determining a natural language description for key frame(s) of a video that demonstrates various aspects of the present disclosure, and in which some implementations disclosed herein can be implemented.

Optionally, a key frame description database (e.g., 150 as shown in FIG. 1C) can be created to include the natural language content generated (by the vision-language model 190A) for each of the videos. Each entry in the key frame description database can correspond to a respective one of the videos and can include a natural language description for key frame(s) for the respective one of the videos. The key frame description database can be stored in the storage 106 and/or 126, for subsequent access, for deleting or modification to existing entries, and/or for update(s) that adds additional entries. For instance, a user can provide a query directed to a video having an entry in the key frame description database. In response to receiving the query, the entry for the video can be accessed to retrieve the natural language description for key frame(s) of the video. A prompt can be generated, e.g., by prompt-generating engine 110, based on the retrieved natural language description and the query. The prompt can be processed as input using the generative model 190B to generate a generative model output from which a natural language response responsive to the query is determined. Optionally, when the query is a spoken query, the natural language response can be processed using the TTS engine 105 and/or 125 to determine audio data for the natural language response. The audio data for the natural language response can be rendered audibly via a client, e.g., via the client computing device 10.

In some implementations, referring to FIG. 1B and FIG. 1C, a user A can provide a user utterance 14 to a client device 10. The user utterance 14 can be processed using the ASR engine 103 (and/or 123) to determine a transcription 141 ("speech recognition", or "transcript") of the user utterance 14. Optionally, a context associated with the user utterance 14 can be determined. The context associated with the user utterance 14 can include, for instance, a date and/or a time the user utterance 14 is received, a status of the client device 10 such as whether microphone(s) of the client device is turned on or off, what application(s) are running in the foreground of the client device 10, and/or content currently being rendered via the client device 10, etc.)

In some implementations, the transcription 141 of the user utterance 14 can be processed using the query determination engine 107 (not depicted in FIG. 1B) to determine whether the transcription 141 of the user utterance 14 includes a user query directed to (e.g., about) a video. In some other implementations, the query determination engine 107 can determine whether the transcription 141 of the user utterance 14 includes a user query directed to a video based on the transcription 141 of the user utterance 14 and/or based on the context associated with the user utterance 14. For example, the query determination engine 107 can determine that the transcription 141 of the user utterance 14 includes a user query directed to a video based on the transcription 141 of the user utterance 14 including or indicating a name (or other identification) of the video (with or without the video being currently played). As another example, the query determination engine 107 can determine that the transcription 141 of the user utterance 14 includes a user query directed to a video based on the context associated with the user utterance 14 indicating that the user query is received while the video is being played (or is received within a predetermined period of time following the play of a last frame of the video). As a further example, the query determination engine 107 can determine that the transcription 141 of the user utterance 14 includes a user query directed to a video based on the transcription 141 of the user utterance 14 including an entity that matches (e.g., is shown in) content of a user interface rendered via the client device 10 and based on the content of the user interface is part of the video. The way the query determination engine 107 determines whether the transcription 141 of the user utterance 14 includes a user query directed to a video, however, is not limited to descriptions provided herein.

In some implementations, the user utterance 14 may not include a query directed to a video. For instance, the user utterance 14 can be "turn off the light", and thus can be determined to include a user query to turn off a lighting device. In this case, in response to the query determination engine 107 determining that the transcription 141 of the user utterance 14 (e.g., "turn off the light" in natural language) does not include a user query directed to a video, the query determination engine 107 (or a query monitoring engine) can be configured to bypass the user utterance 14 (e.g., not processing the user utterance 14) and continue monitoring for any user query that is directed to a video. Additionally or alternatively, the transcription 141 of the user utterance 14 may be processed to determine a user intent and parameter(s) associated with an assistant action of turning off a kitchen light in a kitchen of the user R. The assistant action of turning off a kitchen light in a kitchen of the user R may be performed in response to the user utterance 14.

In some implementations, as a non-limiting example, the user utterance 14 may be "Who will I meet on my first day of school" (as shown in FIG. 1B) and can be determined to include a query directed to the video 15 for a song named "first day of school". In this non-limiting example, the video 15 for the song named "first day of school", for instance, can include the song "first day of school" and/or can include additional songs that are in addition to the song "first day of school". The video 15 can include, for instance, a total of N image frames (sometimes shortly referred to as "frames"). In response to determining that the user utterance 14 is directed to the video 15 for "first day of school", a natural language description for key frame(s) of the video 15 for "first day of school" can be determined (e.g., on the fly) or can be retrieved (from a database, e.g., the aforementioned key frame description database 150, see FIG. 1C).

The natural language description for the key frame(s) of the video 15 for "first day of school" may be determined based on processing the key frame(s) of the video 15 for "first day of school", using the vision-language model 190A. For instance, and with reference to FIG. 1C, assuming the video 15 for "first day of school" includes: a first key frame $KF_1$, a second key frame $KF_2$, . . . , and an $n^{th}$ key frame $KF_n$, where n<N. The first key frame KF1 can be processed as input, using the vision-language model 190A, to generate a first model output from which a first description $D_1$ (in natural language) for the first key frame $KF_1$ is determined. The second key frame $KF_2$ can be processed as input, using the vision-language model 190A, to generate a second model output from which a second description $D_2$ (in natural language) for the second key frame KF2 is determined. . . . The $n^{th}$ key frame $KF_n$ can be processed as input, using the vision-language model 190A, to generate an $n^{th}$ model output from which a $n^{th}$ description $D_n$ (in natural language) for the $n^{th}$ key frame $KF_n$ is determined.

The first description $D_1$ or the first key frame $KF_1$, the second description $D_2$ for the second key frame $KF_2$, . . . , and the $n^{th}$ description $D_n$ for the $n^{th}$ key frame $KF_n$ can be processed (e.g., combined) to determine the natural language description for the key frame(s) of the video 15 for "first day of school". Optionally, the natural language description 153 for the key frame(s) of the video 15 for "first day of school" can be stored separately in association with the video 15 for "first day of school". For instance, an entry 151 can be created in the key frame description database 150 in association with the video for "first day of school". The entry 151 for the video 15 for "first day of school" includes the natural language description for the key frame(s) of the video 15 for "first day of school", and/or an identifier 154 (e.g., name, address, ID number, etc.) of the video 15.

In some implementations, as described above, the video 15 for the "first day of school" may optionally include an additional song (e.g., "get ready for school") that is in addition to the song "first day of school". In this case, as described above, the entry 151 for the video 15 for "first day of school" can include the natural language description for the key frame(s) of the video 15. Alternatively or additionally, the entry 151 for the video 15 for "first day of school" can include a first natural language description for a first subset of the key frame(s) that corresponds to the song "first day of school", and can include a second natural language description for a second subset of the key frame(s) that corresponds to the additional song "get ready for school". For instance, if the first subset of the key frame(s) that corresponds to the song "first day of school" includes key frames KF1˜KFm (1<m<n) and the second subset of the key frame(s) that corresponds to the additional song "get ready for school" includes key frames KFm+1˜KFn, the first natural language description can be generated by processing (e.g., combining) the descriptions D1˜Dm, and the first natural language description can be generated by processing (e.g., combining) the descriptions Dm+1˜Dn. This way, if the query determination engine 107 determines that the user utterance 14 is directed to a portion of the video 15 that corresponds to the song "first day of school" (instead of more coarsely determining that the user utterance 14 is directed to the video 15), the first natural language description for the first subset of the key frame(s) that corresponds to the song "first day of school" can be retrieved from the entry 151 (instead of the natural language description for all the key frame(s) of the video 15), for subsequent processing (e.g., generation of the prompt 17 to be processed using the generative model 190B).

In some implementations, continuing with the non-limiting example above, the key frame(s) of the video 15 for "first day of school" is a subset of all frames of the video 15 for "first day of school". In other words, the total number n of the key frame(s) (e.g., KF1˜KFn) of the video 15 for "first day of school" is less than the total number N of frames (e.g., Frame 1˜N as shown in FIG. 1B) of the video 15 for "first day of school". The key frame(s) of the video 15 for "first day of school" can be determined or selected based on one or more criteria. For example, the one or more criteria can include a measure of visual difference between two adjacent frames of the plurality of video frames. In this example, any two adjacent frames having a visual difference that satisfies a threshold can be selected/collected and be included in the key frame(s). Additionally or alternatively, the one or more criteria can include a new object being detected in a frame of the plurality of frames of the video (e.g., the video 15). In this case, the frame showing the new object (e.g., character, backpack, and/or any other applicable object) can be collected and be included in the key frame(s). Additionally or alternatively, the one or more criteria can include a new voice being detected in an audio portion of the video (e.g., the video 15) that corresponds temporally with a frame of the plurality of frames of the video. In this case, the frame corresponding to the new voice can be collected and be included in the key frame(s). Additionally or alternatively, the one or more criteria can include a classic/well-known scene (or lyric) being detected in a frame of the plurality of frames of the video. Descriptions of the one or more criteria, however, are not limited herein.

Continuing with the above non-limiting example, and referring again to FIGS. 1B and 1C, the prompt-generating engine 110 generates a prompt 17 based on the transcription 141 of the user utterance 14 and/or the natural language description 153 for key frame(s) of the video 15. For instance, the prompt can include the transcription 141 of the user utterance 14 and the natural language description 153 for the key frame(s) of the video 15. Optionally, in some implementations, a current frame 155 of the video 15 (when the utterance is received) can be determined to be related to the utterance 14. For instance, the current frame 155 can be determined to be related to the utterance based on the transcription 141 of the utterance 14 (which can include one or more key words indicating a reference to the current frame 155, e.g., the one or more key words can be determined to match content of the current frame 155). In these implementations, the current frame 155 can be processed as input using the vision-language model 190A, to generate output from which a natural language description 157 for the current frame 155 is determined. In this case, the prompt 17 can be further based on the natural language description 157 for the current frame 155, in addition to being based on the transcription 141 of the user utterance 14 and the natural language description 153 for the key frame(s) of the video 15.

For instance, the prompt 17 can include the transcription 141 of the user utterance 14, the natural language description 153 for the key frame(s) of the video 15, and the natural language description 157 for the current frame 155. In some implementations, however, it is noted that the natural language description 157 for the current frame 155 may not need to be determined or used to formulate the prompt 17, in order to save computing resources and reduce the latency in generating a response responsive to the utterance 14. In some other implementations, a natural language description for not only the current frame, but also for one or more frames preceding the current frame and/or one or more frames succeeding the current frame, can be generated and used in formulating the prompt 17.

The prompt 17 can be processed as input, using the generative model 190B, to generate a generative model output from which a natural language response 173 responsive to the user query that is directed to the video 15 is determined. In some implementations, the natural language response 173 can rendered visually in response to the user utterance 14. In some implementations, alternatively or additionally, the natural language response 173 can be processed using the TTS engine 105, to generate audio data for the natural language response 173. The generated audio data (for the natural language response 173) can be rendered audibly via the client device 10, in response to the user utterance 14.

Figure 2A:
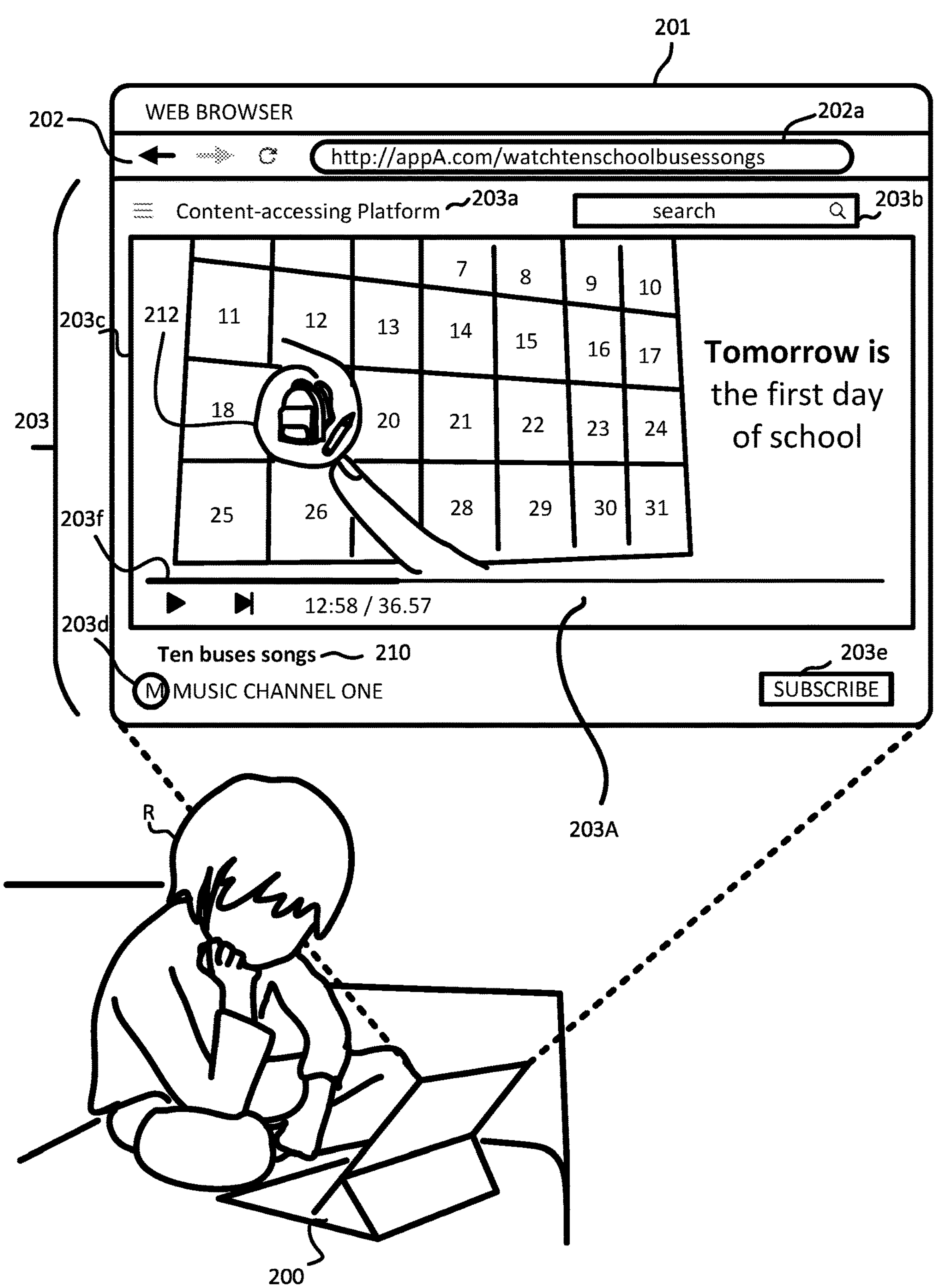
FIG. 2A, FIG. 2B, and FIG. 2C depict a scenario, in accordance with various aspects of the present disclosure.
Figure 2B:
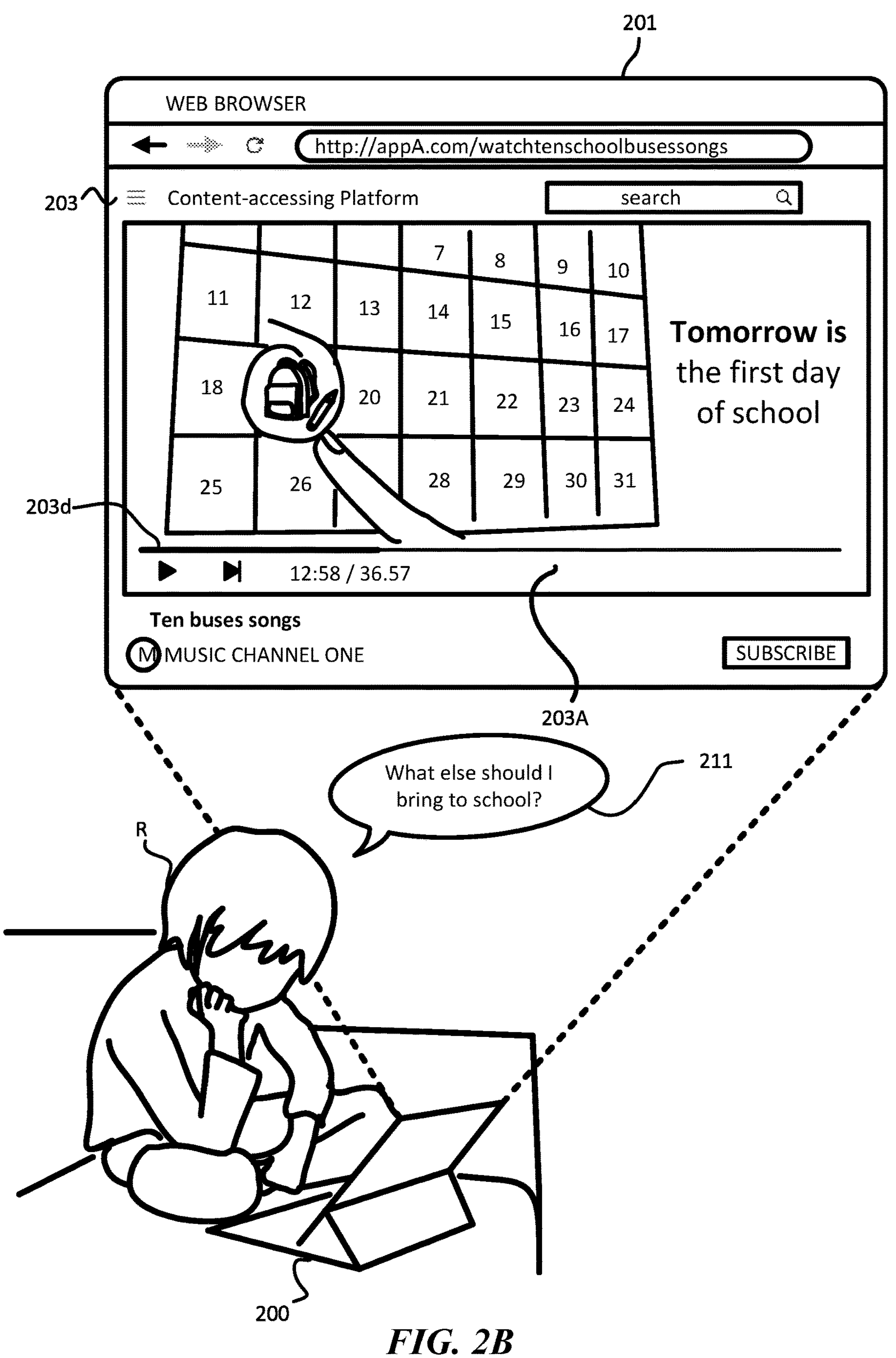
Figure 2C:
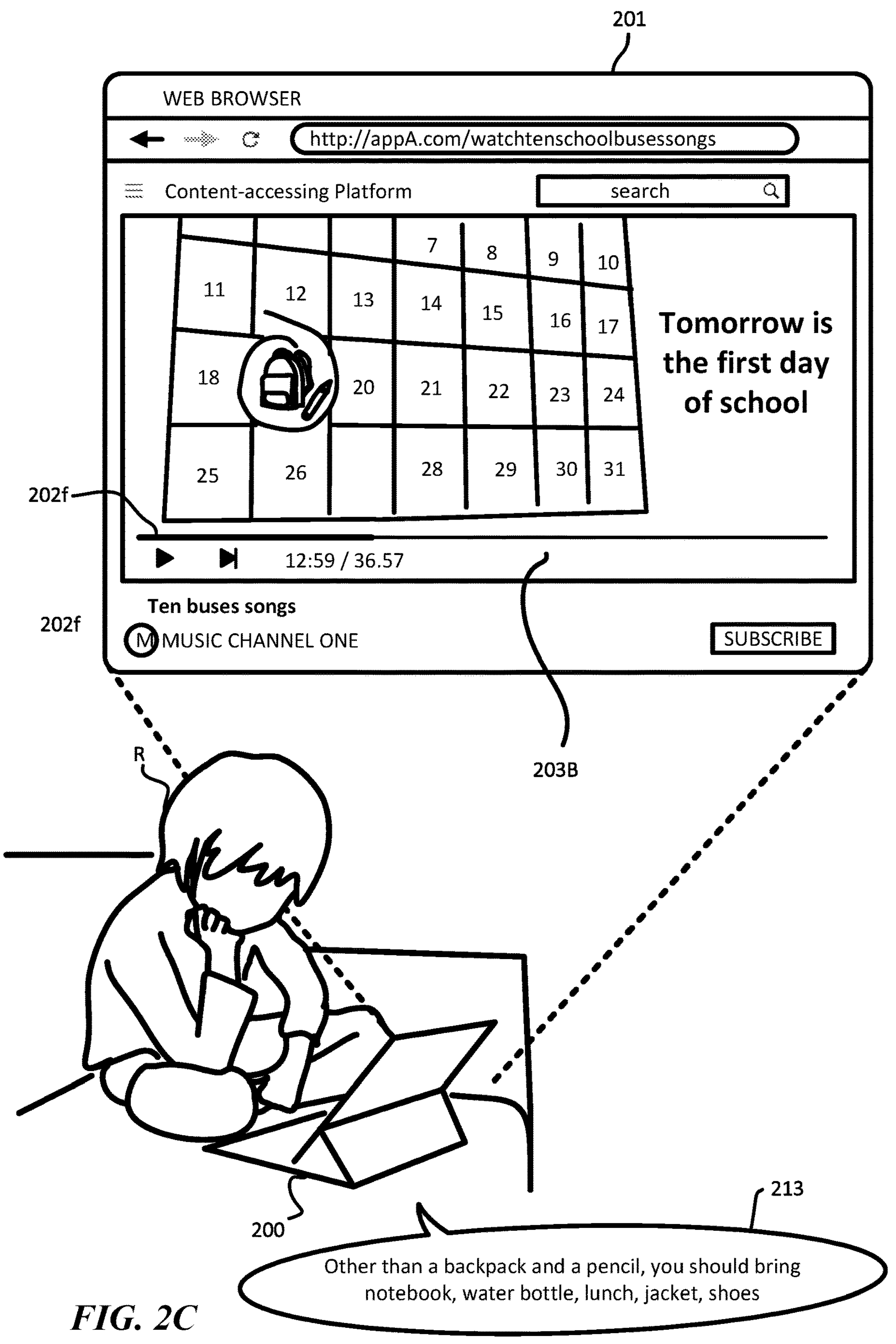

Turning now to FIGS. 2A, 2B, and 2C, a scenario is illustrated in which responsive content is rendered in response to a user query. As shown in FIG. 2A, a user R can be using a computing device 200 to watch a video 210 titled, e.g., "ten buses songs". A user interface 201 of the computing device 200 can include an address navigation region 202 having an address field 202*a* that shows an address (e.g., "http://appA.com/watchgtenschoolbusessongs") of the video 210 titled, e.g., "ten buses songs". The user interface 201 of the computing device 200 can further include a content-displaying region 203 that indicates a platform or application 203*a* that provides access to content (e.g., the video 210 titled "ten buses songs"). Alternatively or additionally, the content-displaying region 203 can include a search field 203*b* that enables the user R (or other users) to search for desired content accessible via the platform or application 203*a* (e.g., content-accessing platform). Alternatively or additionally, the content-displaying region 203 can include a video-displaying area 203*c* that displays the video 210 frame-by-frame.

As shown in FIG. 2A, the video-displaying area 203*c* can be displayed with a frame 203A that corresponds to an image showing textual content (e.g., lyric) of "Tomorrow is the first day of school" (e.g., with the word "Tomorrow" in bold to indicate that audio data for the word "tomorrow" is being concurrently rendered) and showing a calendar which indicates that tomorrow is the $19^{th}$ day of a certain month, where both a backpack and a pencil (see reference numeral 212) are drawn by a character (e.g., mother) in the video 15 for the date (e.g., $19^{th}$) between the $18^{th}$ day and the $20^{th}$ day. Optionally, the content-displaying region 203 can further include other information associated with the video 210, such as the channel 203*d* (e.g., "music channel") that collects the video 210, a selectable element 203*e* which when selected, causes an account of the user R for the platform to be subscribed to the channel 203*d*, and/or a progress bar 203*f* indicating how much the video 210 has been played.

Now turning to FIG. 2B, when the frame 203A is being displayed within the video-displaying area 203*c*, the user R provides an utterance 211 (also referred to as "spoken input", etc.) to the computing device 200. The utterance 211 can be, for instance, "what else should I bring to school?" The utterance 211 can be processed to determine a transcription of the utterance 211. The transcription of the utterance 211 can be processed, and based on processing of the transcription of the utterance 211, it can be determined that the transcription of the utterance 211 includes a user query directed to a video (i.e., the video 210). This for instance, can be determined based on the utterance 211 being received while the video 210 is being rendered at the computing device 10 (and/or based on the transcription of the utterance 211 include a keyword (e.g., "school") that matches the content of the frame 203A).

In response to determining that the transcription of the utterance 211 includes a user query directed to the video 210, a natural language response for key frame(s) of the video 210 can be determined or retrieved, and a prompt can be generated based on the transcription of the utterance 211 and based on the natural language response for the key frame(s) of the video 210. For example, the natural language response can be retrieved from an entry of a database that corresponds to the video 210 and that stores the natural language response in association with the video 210. In this example, the natural language response can be determined based on processing the key frame(s) of the video 210 using a vision-language model (e.g., the aforementioned vision-language model 190A).

The key frame(s) of the video 210 can be a subset of all frames of the video 210, where the key frame(s) of the video 210 can be selected from the video 210 based on one or more criteria. For instance, the video 210 can include five portions (e.g., five songs), and the key frame(s) of the video 210 can be selected to include a first set of frames, e.g., five frames each showing a title for a respective portion (song) of the five portions (five songs). Additionally or alternatively, the key frame(s) of the video 210 can be selected to include a second set of frames. The second set of frames can include, for each portion (song), one or more frames that each shows occurrence of a new object and/or voice. For instance, for a particular portion (a song titled "getting ready for school") of the five portions (five songs) that includes the frame 203A, the second set of frames (which is part of the key frame(s) of the video 210) can include a frame in the particular portion that is first to show a notebook, a frame in the particular portion that is first to show a water bottle, a frame in the particular portion that is first to show lunch food, a frame in the particular portion that is first to show a jacket, a frame in the particular portion that is first to show a pair of shoes, a frame in the particular portion that is first to show a backpack, and a frame in the particular portion that is first to show a pencil.

Assuming the first and second sets of frames together form the key frame(s) for the video 210 in its entirety, each of the first and/or second sets of frames can be processed as input, using a generative model (e.g., the aforementioned generative model 190B), to generate a corresponding model output. Based on the corresponding model output generated for each of the first and/or second sets of frames, the natural language response for the key frame(s) of the video 210 is determined.

In some implementations, based on processing the transcription of the utterance 211, e.g., "what else should I bring to school?", it can be determined that a current frame of the video 210 when the utterance 211 is received is needed in generating a response responsive to the utterance 211. In this case, the current frame of the video 210 (which, e.g., shows the backpack and the pencil) can be processed as input, using the vision-language model (e.g., 190A), to determine a current model output from which a description for the current frame of the video 210 is derived. As described above, a prompt can be generated based on the transcription of the utterance 211 and based on the natural language response for the key frame(s) of the video 210. In this case, the prompt can be generated to include the transcription of the utterance 211 (e.g., "what else should I bring to school?" in natural language), the natural language response for the key frame(s) of the video 210 (e.g., that respectively show a notebook, a water bottle, lunch food, a jacket, a pair of shoes, a backpack, and a pencil), and the description for the current frame of the video 210 (which shows the backpack and the pencil).

The prompt can be processed as input, using the generative model (e.g., 190B), to determine a generative model output from which a natural language response 213 is determined. As shown in FIG. 2C, the natural language response 213, for instance, can be "Other than a backpack and a pencil, you should bring a notebook, water bottle, lunch, jacket, and shoes". Audio data for the natural language response can be generated, and can be rendered for instance, when another frame 203B is rendered within the video-displaying area 203*c*. Alternatively or additionally, the natural language response 213 of "Other than a backpack and a pencil, you should bring a notebook, water bottle, lunch, jacket, and shoes" can be rendered visually, e.g., as an overlay within the video-displaying area 203*c*.

Figure 2D:
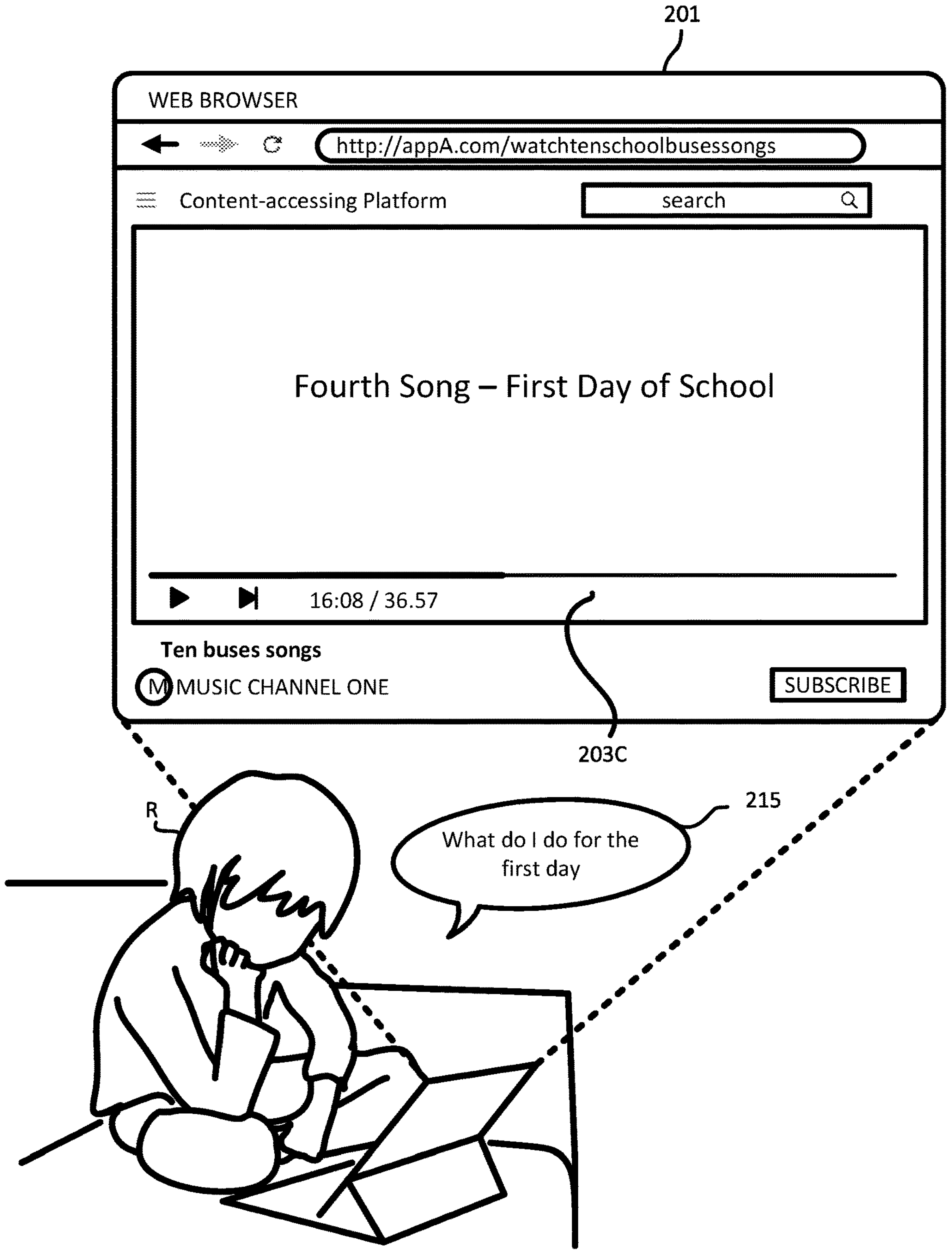
FIG. 2D and FIG. 2E depict another scenario, in accordance with various aspects of the present disclosure.

Now turning to FIG. 2D, as the video 210 continues (or if a new video is under play), the video-displaying area 203*c* can be displayed with a different frame 203C that corresponds to a title of a different song (e.g., a fourth song of "first day of school") of the video 210. The user R may give an additional utterance 215, e.g., "what do I do for the first day?", e.g., while the frame 203C is being displayed. In this case, the additional utterance 215 can be determined to include a natural language query directed to the video 210 (and sometimes being determined to include a query directed to a fourth portion of the video 210 that corresponds to the fourth song of "first day of school"). In this example, an additional prompt can be generated to include a transcription of the additional utterance 215 ("what do I do for the first day?" in natural language) and the aforementioned natural language description for the key frame(s) of the video 210 (which can show a child entering a classroom, meeting a teacher, finding her cubby, hanging her backpack, giving her mom a hug, and playing a game with other children, in addition to the key frames showing the notebook, the water bottle, the lunch food, the jacket, the pair of shoes, the backpack, and the pencil, as described above).

It is noted that, in some implementations, alternatively, the additional prompt can be generated to include a transcription of the additional utterance 215 ("what do I do for the first day?" in natural language) and a natural language description for a subset of the key frame(s) of the video 210 that corresponds to the fourth song of "first day of school" (which can show a child entering a classroom, meeting a teacher, finding her cubby, hanging her backpack, giving her mom a hug, and playing a game with other children, without the key frames showing the notebook, the water bottle, the lunch food, the jacket, the pair of shoes, the backpack, and the pencil, as described above).

Figure 2E:
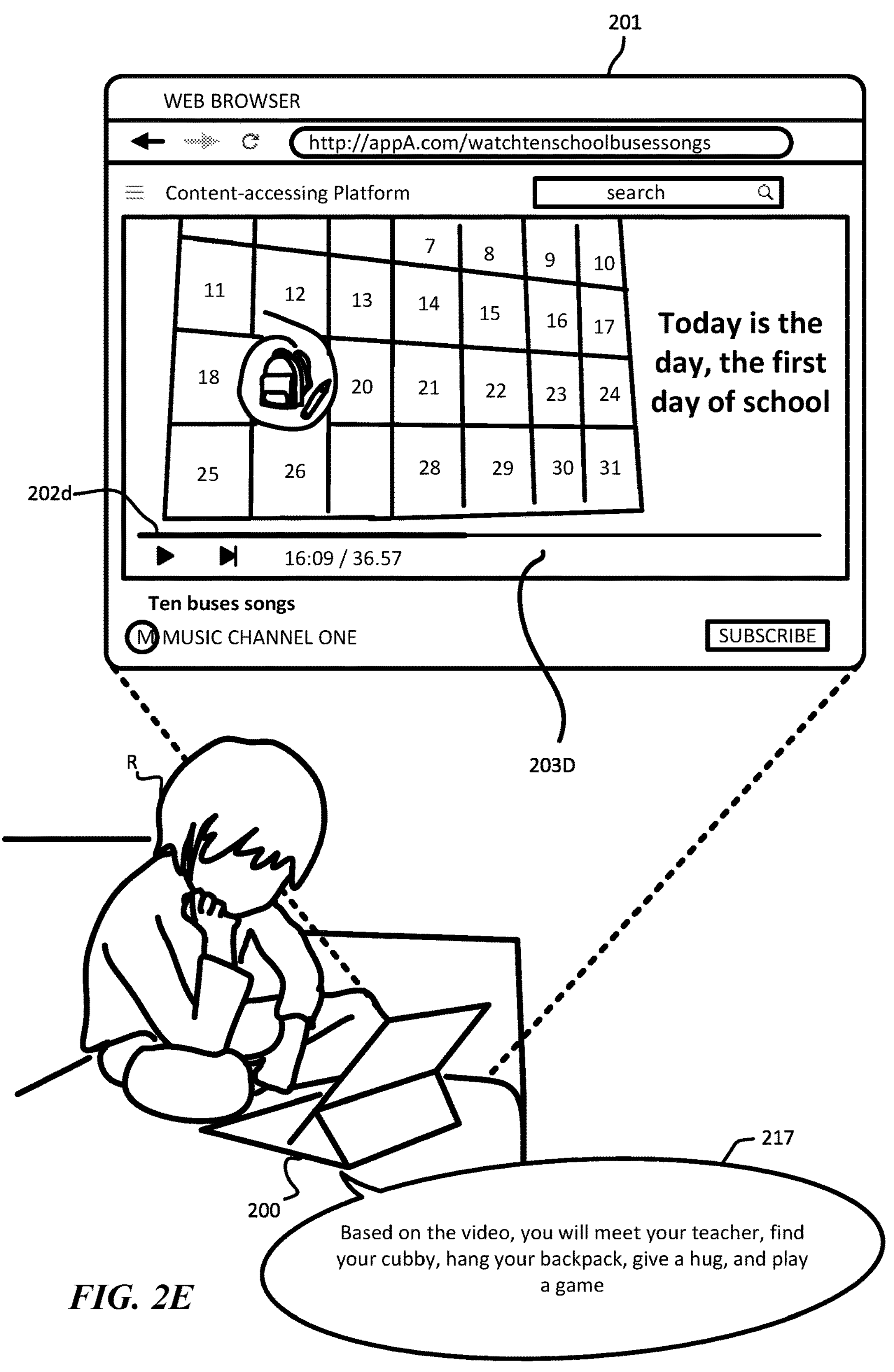

The additional prompt can be processed as input, using the generative model (e.g., 190B), to determine an additional generative model output from which an additional natural language response 217 is determined. As shown in FIG. 2E, the additional natural language response, for instance, can be "Based on the video, you will meet your teacher in a classroom, find your cubby, hang your backpack, give a hug, and play a game". As another example, the additional natural language response 217 can be, "Don't be nervous, you will have a great time for the first day. Just meet your teacher in a classroom, find your cubby, hang your backpack, give a hug, and play a game". In this example, the additional natural language response 217 can indicate a tone determined based on audio features of the additional utterance 215 (e.g., which may indicate an age or other characteristics of the user R) and/or content of the frame 203C that corresponds to the additional utterance 215. In some implementations, the additional natural language response 217 can be rendered visually within the video-displaying area 203*c* (e.g., as an overlay or in any other applicable manners). Alternatively or additionally, audio data for the additional natural language response 217 can be generated. The audio data for the additional natural language response 217 can be audibly rendered, for instance, when another frame 203D is rendered within the video-displaying area 203*c*.

Figure 3:
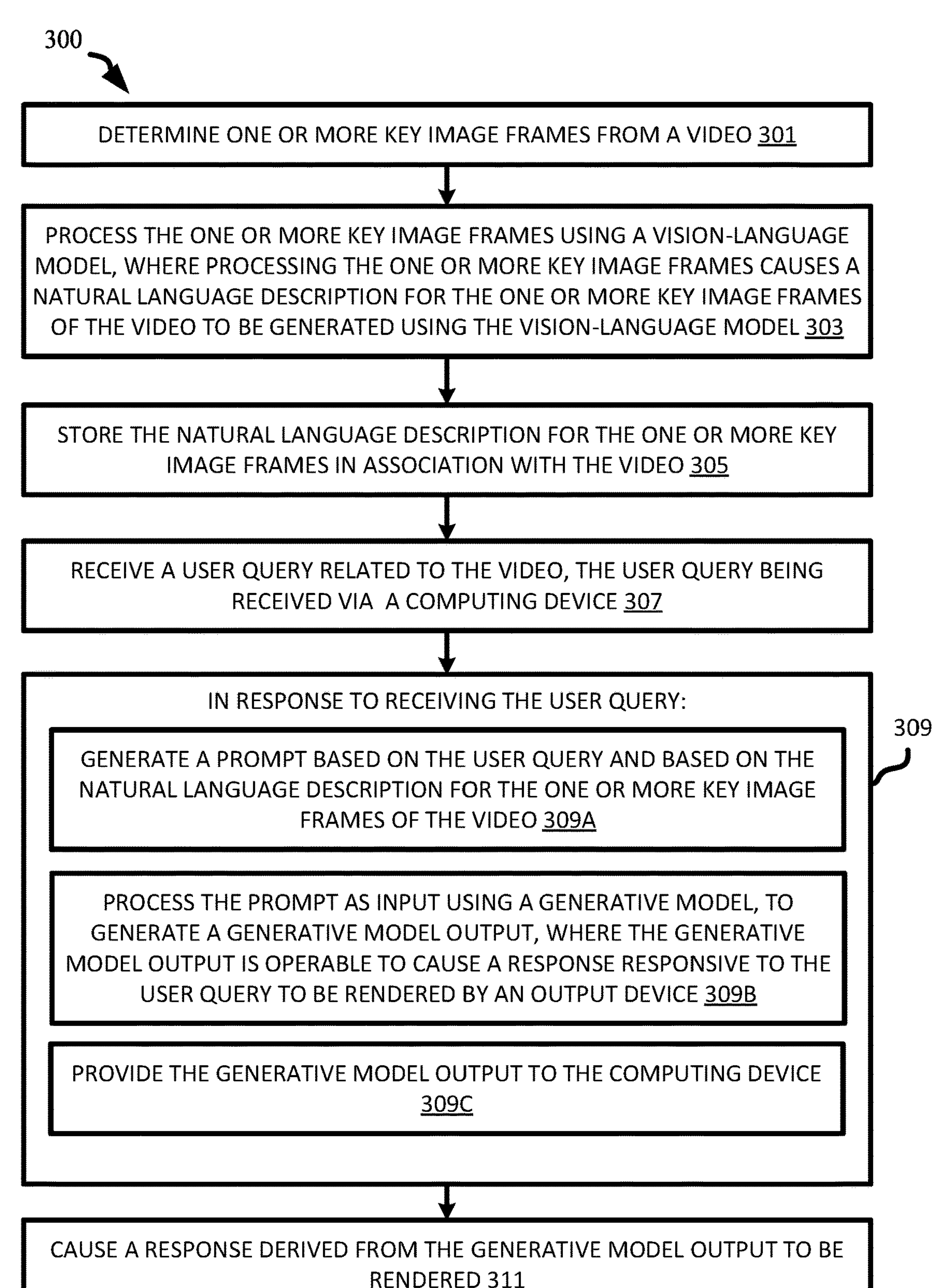
FIG. 3 depicts a flowchart illustrating an example method of generating content responsive to a user query, in accordance with various aspects of the present disclosure.

Turning now to FIG. 3, a flowchart is depicted that illustrates an example method of generating content responsive to a user request to generate content, in accordance with various aspects of the present disclosure. For convenience, the operations of the method 300 are described with reference to a system that performs the operations. This system of the method 300 includes one or more processors, memory, and/or other component(s) of computing device(s) (e.g., client computing device 10 of FIG. 1, one or more servers, and/or other computing devices). Moreover, while operations of the method 300 are shown in a particular order, this is not meant to be limiting. One or more operations may be reordered, omitted, and/or added.

At block 301, the system, e.g., by way of key frame determination engine 112, determines (e.g., selects) one or more key image frames from a video. In some implementations, determining the one or more keyframes from the video may include: evaluating a plurality of frames of the video to select, as the one or more key video frames that comprise less than all of the frames of the video, one or more of the plurality of frames that satisfy one or more criteria. In these implementations, the one or more criteria may include a measure of visual difference between two adjacent frames of the plurality of video frames satisfying a threshold. Alternatively or additionally, the one or more criteria may include a new object being detected in a frame of the plurality of frames of the video. Alternatively or additionally, the one or more criteria may include a new voice being detected in an audio portion of the video that corresponds temporally with a frame of the plurality of frames of the video.

At block 303, the system, e.g., by way of vision-language model engine 108, processes the one or more key image frames using a vision-language model 190A. Processing the one or more key image frames may cause a natural language description for the one or more key image frames of the video to be generated using the vision-language model. In some implementations, the one or more key image frames may include multiple key image frames. In this case, processing the one or more key image frames using the vision-language model may include: for each of multiple key image frames: processing a respective key image frame as input using the vision-language model, to generate a respective model output from which a respective text is determined for the respective key image frame, and assembling the natural language description based on a combination of the respective text for each of the multiple key image frames.

At block 305, the system stores the natural language description for the one or more key image frames in association with the video, e.g., in one or more databases such as 106, 126, 150.

At block 307, the system receives, from a computing device, a user query related to the video. In some implementations, the user query can be determined as being related to the video based on the user query being received when a current image frame of the video is being rendered. In these implementations, the one or more key image frames includes the current image frame. Alternatively or additionally, the one or more key image frames may include a first key image frame that occurs earlier than the current image frame in the video. Alternatively or additionally, the one or more key image frames may include a second key image frame that occurs later than the current image frame in the video.

At block 309, the system performs one or more actions in response to receiving the user query. For instance, the system can perform an action of generating a prompt based on the user query and based on the natural language description for the one or more key image frames of the video (309A). The system can further perform an action of processing the prompt as input using a generative model, to generate a generative model output. The generative model output may be operable to cause a response responsive to the user query to be rendered by an output device (309B). For instance, the generative model output may include, or include instructions to generate, HTML or other similar markup language that can be rendered by applications such as a web browser. The system can further perform an action of providing the generative model output to the computing device (309C).

In some implementations, optionally, at block 311, the system can further cause a response generated from the generative model output to be rendered (visually and/or audibly). The response can be rendered, for instance, via the computing device that receives the user query. The response can be rendered visually or audibly, depending on a type or source of the user query. For instance, if the user query is a typed input or is determined from the typed input, the response can be rendered visually at a user interface of the computing device. As another example, if the user query is an audible input or is determined from audio data capturing a user utterance, the response can be rendered audibly in response to the user utterance. However, the manner in which the response is rendered is not limited herein.

Turning now to FIG. 4, a flowchart is depicted that illustrates another example method of generating content responsive to a user request to generate content, in accordance with various aspects of the present disclosure. This system of the method 400 includes one or more processors, memory, and/or other component(s) of computing device(s) (e.g., client computing device 10 of FIG. 1, one or more servers, and/or other computing devices). Moreover, while operations of the method 400 are shown in a particular order, this is not meant to be limiting. One or more operations may be reordered, omitted, and/or added.

At block 401, the system receives a user query directed to (e.g., about content depicted in) a video. In some implementations, the system can determine that the user query is directed to the video based on the user query being received while the video is being rendered/played. In some other implementations, the system can determine that the user query is directed to the video based on the user query being received within a predefined period of time (e.g., 1 second) since the video stops playing. In some other implementations, the system can determine that the user query is directed to the video based on content of the user query including a reference (e.g., title, a famous lyric, an identifier, etc.) of the video. The system can also determine that the user query is directed to the video based on other manner(s), and the present disclosure is not limited herein.

At block 403, the system performs one or more actions in response to receiving the user query while the video is being rendered. For instance, the system can, at block 403A, generate a prompt based on the user query and based on a natural language description for one or more image frames selected from the video. The system can, at block 403B, process the prompt as input using a generative model, to generate a generative model output from which a response responsive to the user query is determined. The system can, at block 403C, cause the response responsive to the user query to be rendered.

In some implementations, the natural language description for the one or more image frames of the video is determined based on processing the one or more image frames using a vision-language model.

In some implementations, the one or more image frames include one or more key image frames of the video. In some implementations, the natural language description for the one or more image frames of the video may include text for the one or more key image frames of the video. In these implementations, the text for the one or more key image frames of the video may be determined by, for instance, extracting the one or more key image frames from the video; providing the one or more key image frames to a vision-language model to cause each of the one or more key image frames to be processed as input using the vision-language model, respectively, to generate a respective model output from which a respective textual output for a respective key image frame is derived; and generating the text for the one or more key image frames to include the respective text output for each of the one or more key image frames.

In some implementations, the text for the one or more key image frames is generated prior to receiving the user query.

In some implementations, the one or more image frames further include a current image frame of the video. In some implementations, the natural language description for the one or more image frames of the video includes a text for the one or more key image frames of the video and an additional text for the current image frame of the video. In some implementations, the additional text for the current image frame of the video is generated based on processing the current image frame as input using the vision-language model. In some implementations, the one or more image frames further include an image frame preceding the current image frame of the video. In some implementations, the one or more image frames further include an additional image frame succeeding the current image frame of the video.

In some implementations, the one or more image frames further include one or more frames preceding the current image frame of the video. Alternatively or additionally, in some implementations, the one or more image frames further include one or more frames succeeding the current image frame of the video. The number of the one or more frames preceding or succeeding the current image frame of the video may be configured to not exceed a frame number threshold (e.g., 2 or 3).

Figure 5:
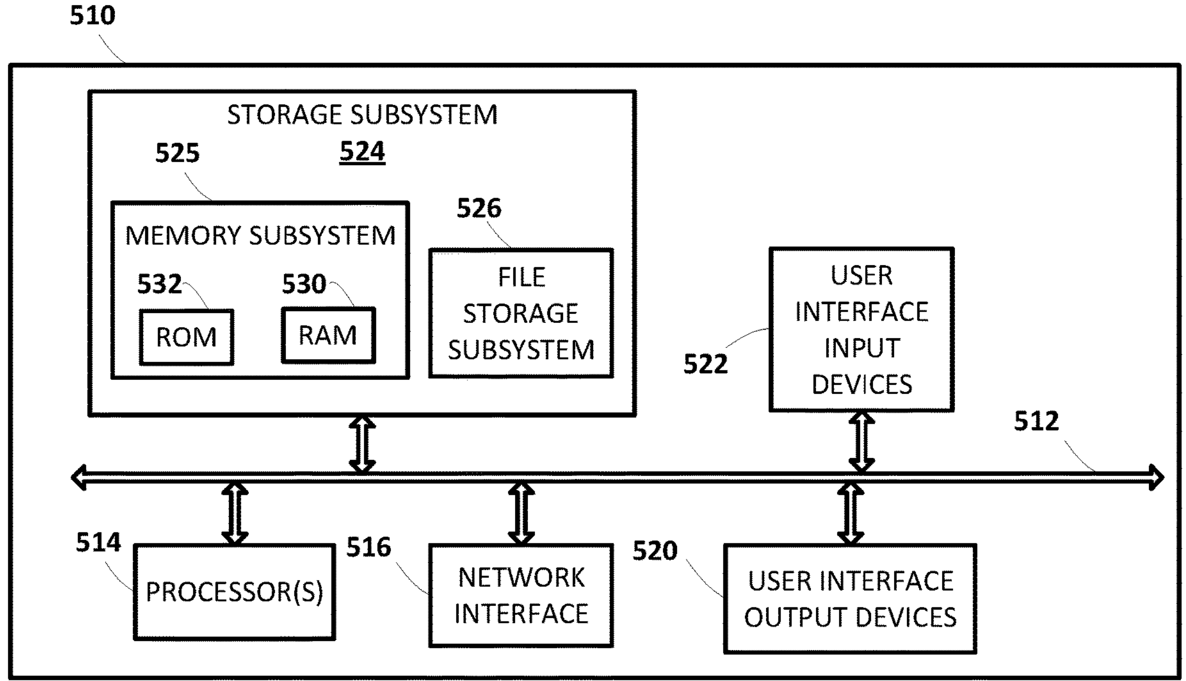
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based LLM-based assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

What is claimed is:

1. A method implemented by one or more processors, the method comprising:

determining a plurality of key image frames from a video, wherein the plurality of key image frames includes a past key image frame that occurs earlier than a current image frame in the video and a future key image frame that occurs later than the current image frame in the video;

processing the plurality of key image frames, including the past and future key image frames, using a vision-language model, wherein processing the plurality of key image frames using the vision-language model causes a natural language description of the past and future key image frames to be generated using the vision-language model;

storing the natural language description for the plurality of key image frames in association with the video;

receiving, from a computing device, a user query related to the video, wherein the user query is received when the current image frame of the video is being rendered; and in response to receiving the user query, generating a prompt based on the user query and based on the natural language description for the plurality of key image frames of the video, processing the prompt as input using a generative model, to generate a generative model output, wherein the generative model output is operable to cause a response responsive to the user query to be rendered by an output device, and providing the generative model output to the computing device.

2. The method of claim 1, wherein processing the plurality of key image frames using the vision-language model comprises, for each of multiple key image frames:

processing a respective key image frame as input using the vision-language model, to generate a respective model output from which a respective text is determined for the respective key image frame, and assembling the natural language description based on a combination of the respective text for each of the multiple key image frames.

3. The method of claim 1, wherein determining the plurality of key image frames from the video comprises evaluating a plurality of frames of the video to select, as the plurality of key video frames that comprise less than all of the frames of the video, one or more of the plurality of frames that satisfy one or more criteria.

4. The method of claim 3, wherein the one or more criteria include a measure of visual difference between two adjacent frames of the plurality of video frames satisfying a threshold.

5. The method of claim 3, wherein the one or more criteria include a new object being detected in a frame of the plurality of frames of the video.

6. The method of claim 3, wherein the one or more criteria include a new voice being detected in an audio portion of the video that corresponds temporally with a frame of the plurality of frames of the video.

7. A system comprising one or more processors and a memory storing instructions that, when executed on the one or more processors, cause the one or more processors to:

determine a plurality of key image frames from a video, wherein the plurality of key image frames includes a past key image frame that occurs earlier than a current image frame in the video and a future key image frame that occurs later than the current image frame in the video;

process the plurality of key image frames, including the past and future key image frames, using a vision-language model, wherein processing the plurality of key image frames using the vision-language model causes a natural language description of the past and future key image frames to be generated using the vision-language model;

store the natural language description for the plurality of key image frames in association with the video;

receive, from a computing device, a user query related to the video, wherein the user query is received when the current image frame of the video is being rendered; and in response to receiving the user query, generate a prompt based on the user query and based on the natural language description for the plurality of key image frames of the video, process the prompt as input using a generative model, to generate a generative model output, wherein the generative model output is operable to cause a response responsive to the user query to be rendered by an output device, and provide the generative model output to the computing device.

* * * * *